May 4, 1954
L. CAGNIARD
2,677,801
GEOPHYSICAL EXPLORATION METHOD
Filed Sept. 24, 1951
2 Sheets-Sheet 1
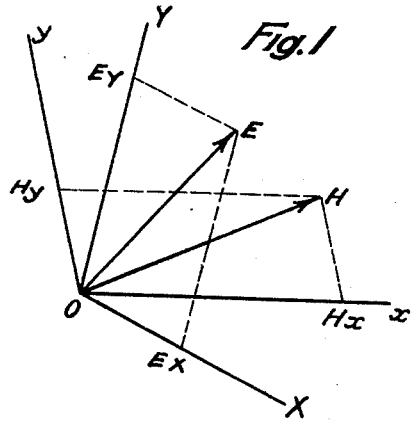
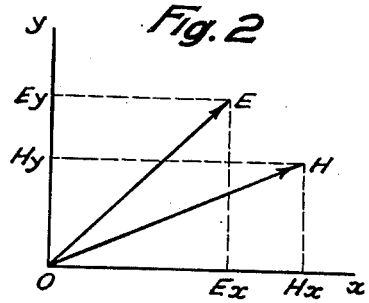
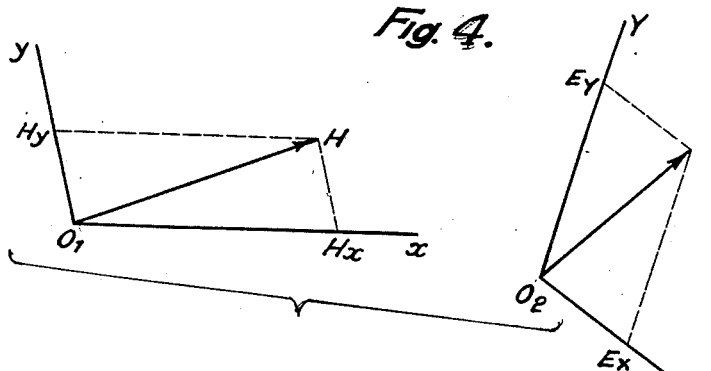
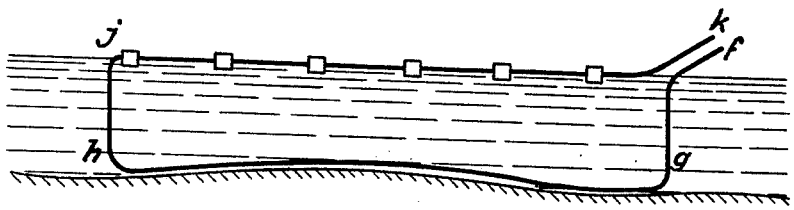
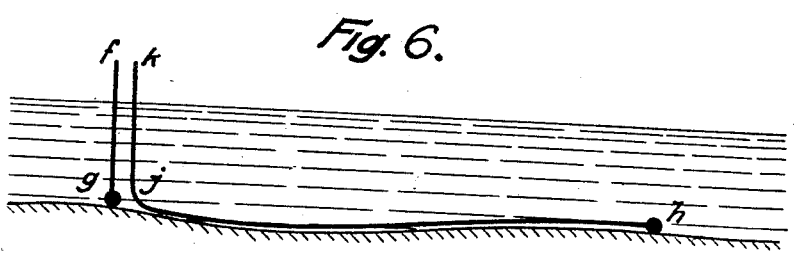
Inventor:
Louis Cagniard,
By his attorneys:
Baldwin & Wight May 4, 1954 L. CAGNIARD 2,677,801
GEOPHYSICAL EXPLORATION METHOD
Filed Sept. 24, 1951 2 Sheets-Sheet 2

INVENTOR
LOUIS CAGNIARD,
BY Baldwin & Wight
ATTORNEYS

Patented May 4, 1954

2,677,801

UNITED STATES PATENT OFFICE 2,677,801

GEOPHYSICAL EXPLORATION METHOD

Louis Cagniard, Paris, France, assignor to Centre National de la Recherche Scientifique, Paris, France, a corporation of France Application September 24, 1951, Serial No. 248,085

Claims priority, application France October 6, 1950

8 Claims. (Cl. 324—1)

The present invention concerns a method and apparatus for the electrical exploration of the underground, based on a comparison of the simultaneous variations of the electric field and magnetic field to which the circulation of telluric currents gives rise.

It is well known that natural electric currents, which are denominated "telluric currents" are permanently circulating inside the earth crust. They offer incessant and unpredictable variations in direction and intensity.

In countries which are equipped industrially, accidental or deliberate groundings of some portions of electrical installations also generate artificial telluric currents, known as erratic currents and which are superposed on the natural telluric currents. No distinction will be made, hereinafter between the natural telluric currents and those of artificial origin.

The present invention is based essentially on the utilization of the aforesaid currents to the exclusion of any other electric current generated artificially for geophysical exploration purposes.

The flow of telluric currents in the ground, like the flow of any electric current, depends upon the structure of the underground, that is to say on the unequal distribution, in depth, of rocks or ores offering various electrical resistivities.

Reciprocally, a study of the distribution of these currents makes it possible to determine, to a certain extent, the distribution in depth of electrical resistivities, and therefore to obtain certain indications of practical interest on the nature of the underground, on the presence or absence of a mineral deposit, on the location of said deposit, etc.

The "telluric currents" vary ceaselessly, not only in magnitude but also in direction and polarity. Said currents comprise individual components of varied periods, which are superposed to form actually an extremely complex "spectrum." Considering that the components which are usually studied are only those which have a relatively high period, e. g. higher than one second, it is more convenient to measure or register said components with the same type of apparatus which is used to measure or register direct currents, i. e., with various types of D. C. galvanometers, D. C. amplifiers, etc. It is for this reason only that they may be qualified as direct currents but, in fact, there is a contradiction between the adjective "direct" (i. e. constant), and variable. And, a fundamental feature of the telluric currents is precisely that they are variable, and therefore involve "skin effect" which is made use of in the invention.

For the very low frequencies involved, the order of magnitude of the skin effect, far from being negligible, is precisely that which may and does interest the geologists and prospectors.

This means, that beyond a certain depth, at any rate, the amplitude of telluric variations decreases rapidly. Practically, this amplitude becomes negligible at depths of the order of one kilometer, or of tens, or of hundreds of kilometers, according to the structure of the underground, the electrical resistivity of rocks and according to the magnitude of the period of pseudo-period of the telluric variations considered.

For example, in a ground having a uniform resistivity $r$, if the alternating telluric sheet has a period $T$, the current density decreases exponentially as a function of the depth. The depth at which the amplitude of this current density is reduced to a fraction $$\frac{1}{e}$$

of its value at the ground surface will be called "depth of penetration" and shall be designated by $P_0$ ($e$ designating the basis of Neperian logarithms). Assuming electro-magnetic units, $$P_0 = \frac{1}{2\pi}\sqrt{rT}$$

Experience shows that the magnetic field at the ground surface also undergoes rapid and unpredictable variations which are not independent of the variations in direction and intensity of telluric currents. Up to now, however, no quantitative relationship had been discovered between these various quantities.

The applicant found that by application of the laws of electro-magnetism, numerical relationships between telluric and magnetic variations can actually be calculated when the structure of the underground and the electrical resistivity of the geologic bodies are known. As in all geophysical methods, these calculations can be carried out in practice with more or less accuracy according to the degree of complexity of the underground structure.

Reciprocally, when the existence of any one or another numerical relationship has been found experimentally between the telluric and magnetic variations, at a given point of the explorated ground, it is possible to interpret this numerical relationship by means of the laws of electromagnetism, and to conclude therefrom, with a greater or lesser degree of accuracy, according to the case and practical needs, that the underground offers locally a particular geologic structure.

The method according to the invention is explained with more details hereinafter, with reference to the appended drawings, in which:

Fig. 1 is a diagram showing two systems of coordinate axes to which are respectively referred the components of the magnetic and electric fields which are to be measured, said axes being drawn in a horizontal plane passing through station O where the measurements are carried out;

Fig. 2 is a diagram showing a single system of coordinate axes to which are referred the components of both the magnetic and the electric fields which are to be measured;

Fig. 4 is a diagram showing two systems of horizontal coordinate axes drawn in the horizontal planes passing through the stations $O_1$ and $O_2$ at which the measurements are to be carried out;

Fig. 5 is a diagrammatic view of an arrangement for measuring the magnetic field in case of a measurement under water; and Fig. 6 is a similar view of a modification of such an arrangement.

Figure 3:
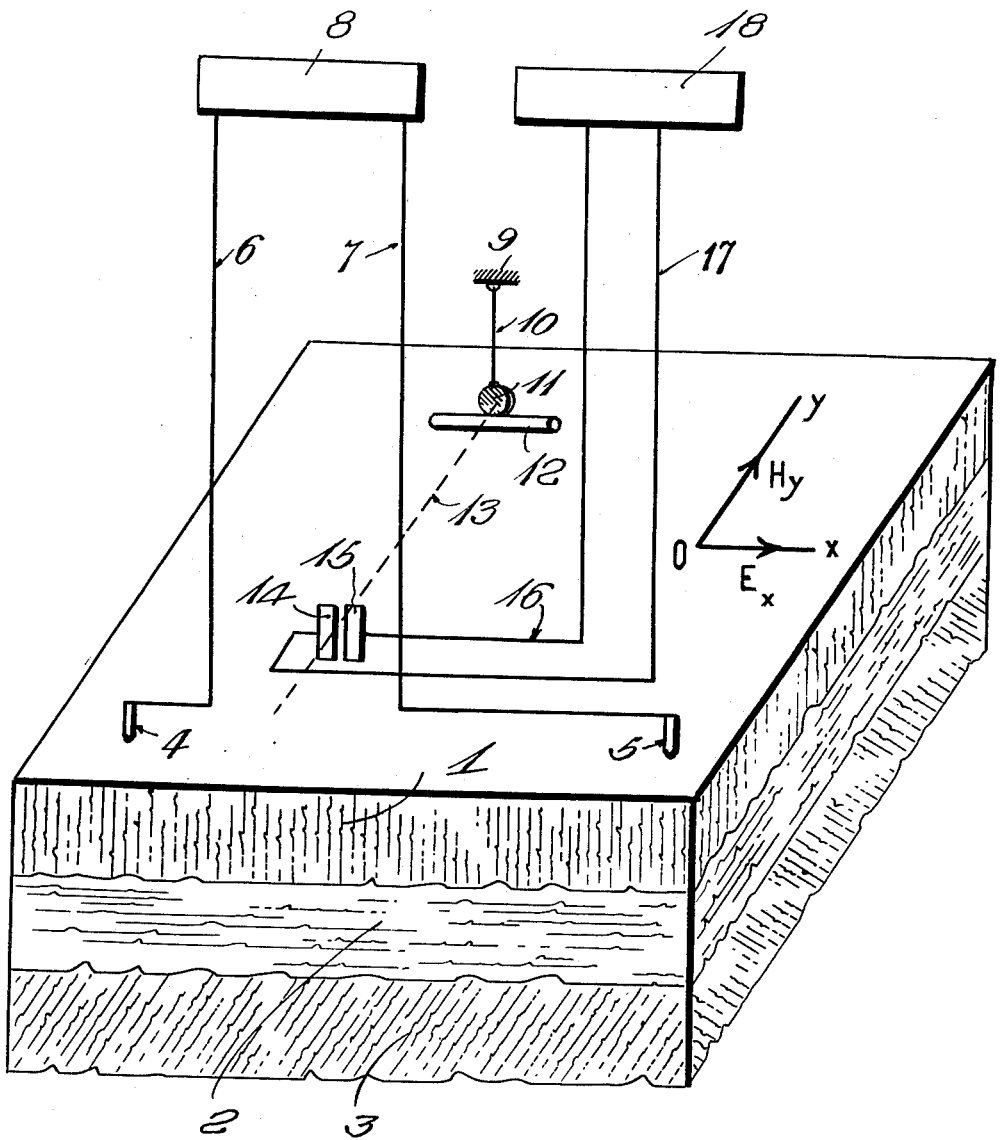
Fig. 3 is a diagrammatic, perspective view of an arrangement of apparatus for carrying out the measurements involved in the method according to the invention.

The invention provides a method and apparatus for geophysical exploration which comprises means adapted for measuring and recording over a given period of time values representing variations occurring in the electric telluric field and further means adapted for measuring and recording over the same period of time values representing variations occurring in the earth's magnetic field, whereby a comparison of the simultaneous variations occurring in said values may be made for the purpose of making geophysical deductions.

The two said measuring and recording means may be adapted to measure and record their respective variations over the same period of time by being specially connected up in relation to each other for such purpose and by being adapted, for example, to record their respective variations on one and the same record, such as on the same band of paper, photographic paper, photographic film or the equivalent, or they may be set up to function at different places on a time basis so as to obtain simultaneous but entirely separate records which are later compared.

Let there be considered for example, an underground having a structure as complicated as may be imagined. Let there also be considered a sheet of telluric current flowing in this ground having any direction, intensity and phase whatsoever, with the only restriction that this telluric current is sinusoidal and has a well defined period T. Still more generally we can imagine any number of telluric sheets, each one of them having the above described constitution, flowing simultaneously in the ground. If the telluric current under consideration is an artificial one, it will be assumed, besides, that the distance separating the point of observation from the electric sources of this current, is large as compared with both the depth of penetration and the length of the lines used for measuring the electric field. Then let four axes of coordinates $Ox$, $Oy$, $OX$, $OY$ be traced in any direction in the horizontal plane, from the point O of observation (Fig. 1). Let $H_x$, $H_y$, $E_X$, $E_Y$ be the complex amplitudes of the respective components of the magnetic and electric fields at O along the corresponding axes. There is a general relationship of the form:

$$H_x = aE_X + bE_Y$$
$$H_y = cE_X + dE_Y$$

in which $a$, $b$, $c$, $d$ are four complex constants independent of the amplitude and phase of the four components $E_X$, $E_Y$, $H_x$, $H_y$.

In practice, the current variations are not generally sinusoidal, but the above relationship holds for each sinusoidal component of a period T present in the telluric sheet. Thus, $a$, $b$, $c$, $d$, are not in general just complex constants, but four complex functions of the variable T. These functions can be determined both by calculation utilizing the laws of electromagnetism and by experiments.

According to the present invention this is utilized in the quantitative relationships existing locally between the electric field variations and the magnetic field variations and the operational steps consist in determining from experience, at a given station the numbers $a$, $b$, $c$, $d$, characteristics of each constituent of period T, present in the telluric sheet, in repeating, generally similar measurements at other stations, suitably spaced on the ground to be explored, in setting up, if necessary, one or more maps of the magneto-telluric anomalies observed; in interpreting the results of the measurements either for each station separately or by comparison between stations, according to the laws of electromagnetism; in establishing a map of the underground structure, all this being in accordance with the methods generally used in the art of geophysical prospecting.

It is obvious that instead of considering the electric and magnetic fields themselves, other quantities related to them can be used, such as the horizontal components of the current density, the derivatives of all orders with respect to time, the integrals of these same quantities or still any combination between them. Thus one modification, which may offer certain practical advantages shall consist in replacing the measurement of the fields by the measurement of other related quantities.

In a second and simplifying modification, the electric and magnetic fields or their related quantities will be referred to the same axes of coordinates $O_x$, $O_y$ (Fig. 2) so that the relationships become:

$$H_x = AE_x + BE_y$$
$$H_y = CE_x + DE_y$$

New simplifying modifications, which are usually by far the most advisable consist in choosing rectangular axes, in selecting for one of them the general tectonic direction if this direction is known approximatively.

Another simplifying modification will consist in considering only the moduli of the complex numbers A, B, C, D or $a$, $b$, $c$, $d$, in other words in measuring only amplitude ratios, which are more significant than the phase differences. The observation of these phase differences, however, is capable of bringing a valuable confirmation to the interpretations based exclusively on amplitude ratios and it is not advisable to leave them systematically aside.

It is well known that sheets of telluric currents often flow over hundreds of kilometers without deviating appreciably in direction. A priori, these deviations must be in most cases negligible in the very limited area involved in the comparison of the electric and magnetic fields. The result, therefore, is that the two coefficients A and D are practically negligible. This is the case, a fortiori, when one of the axes coincides with the tectonic direction. Hence a new simplifying modification, often very advisable, consists in having the determinations bear only on coefficients B and C.

Further, in an area of a supposed perfectly flat structure, not only A and D are strictly zero, but also B and C are two opposite numbers. If the underground has only approximately this constitution and if the flexures or tectonic accidents are not too pronounced, B and C remain approximately equal in absolute values so that a new simplifying modification which will be applied each time it proves sufficient, consists in the sole determination, at each station, of the horizontal component of the electric field in a given direction and of the magnetic field component in the orthogonal direction.

This last and most simplifying modification will often constitute the method to be chosen for studying large sedimentary deposits when looking for oil. Independently of its rapidity and economy the magneto-telluric method herein described may yield, for the underground, truly quantitative data, which would quite evidently remain outside the scope not only of the telluric methods used heretofore, but even of gravimetric and magnetic methods. The few following examples will be sufficient to prove it.

If the underground is homogeneous, the modulus of the quotient $H_y/E_x$, equal to $$\sqrt{\frac{2T}{r}}$$

gives the resistivity $r$ of this underground. If it is not homogeneous, the experimental determination of this modulus gives an apparent resistivity $r_a$, which will be a sort of resistivity average calculated for a depth of the order of magnitude of the depth of penetration. Still better, the consideration of the magneto-telluric components of various periods, makes it possible to determine, at a given station, how the apparent resistivity varies locally with the depth of penetration. Thus, this is the equivalent of what is usually called an electric sounding (or vertical investigation) that is a sounding performed in a single operation of short duration, and effective to considerable depths. It may be recalled that the interpretations of electrical soundings of conventional types are extremely tedious and that they become unpracticable as soon as the underground is a little complex. In the method herein recommended the interpretation formulae for a flat structure, comprise neither integrals nor series and can be computed numerically without any particular difficulty, even in the case of a fairly high number of ground layers.

It is possible, sometimes, to simplify the prospecting problem and to consider that a ground, having a substantially uniform resistivity, lays on a much more resistant basement which, due to tectonic accidents, could be at various depths P, according to the location. Provided P is much lower than the depth of penetration $P_0$ of the upper ground, the modulus of $H_y/E_x$ is proportional to P for each given period. Thus the magneto-telluric method of exploration allows a mapping of the substratum, which, to a large extent, will be a quantitative one instead of being only qualitative.

All the operations required by the practical application of the method i. e. the observation, measuring and recording, as well as the study and comparison of the electric and magnetic fields, are just common operations daily carried out in geophysical observatories and by exploration teams. There is thus no need to enter in the description of these technical processes at length and to consider their innumerable possibilities of modifications.

There will be described, however, by way of non-limitative example, only, various ways of putting the invention into practice. Thus, when one is only interested in variations having pseudo-periods extending from a few seconds to several minutes, one may use measuring and recording means comprising two galvanometers focusing their spots on the same strip of photographic paper moving at a speed of a few centimeters per minute. The duration of the recording will very much depend upon the following points: the overall precision to obtain, the accuracy of the analysis of the various magneto-telluric components according to whether it is intended to keep to a summary inspection of the amplitudes and pseudo-periods of the most characteristic and sharp components or to effect a fine harmonic or pseudo-harmonic analysis by an application of any known physical, mechanical or mathematical method, commonly used for studying all variable phenomena. When the method is used for carrying out the first exploration of unknown grounds and immense areas in order to get only a rough result, the most important considerations being then time and money, a recording time of about ten minutes will generally be sufficient. One of the galvanometers recording the variations of $E_x$, is inserted in an insulated electric line, laid on the ground, parallel with $Ox$, the two ends of which are connected to electrodes buried in the ground, preferably of a nonpolarized type. For the measuring and registering of $H_y$, a conventional horizontal Schmidt type magnetometer may be used, in which the moving magnet system is supported on a quartz knife-edge resting on two semi-cylindrical quartz-bearings (see Jakosky, Exploration Geophysics, Los Angeles 1950, second edition, page 121). The said magnetometer should be arranged in such a manner that the knife edge will be parallel with $Ox$, the magnetic system being adjusted by means of weights or by means of an auxiliary magnetic field. An embodiment of an apparatus for carrying out the said measurements is shown in Fig. 3. In said figure, a section of the soil and subsoil has been shown, with three successive layers 1, 2 and 3. The values, the variations of which are to be measured, are the horizontal component $E_x$ of the electric telluric field along axis $Ox$ and the horizontal component $H_y$ of the magnetic field, along axis $Oy$ perpendicular to $Ox$. Two electrodes 4 and 5 are driven into the ground on a line which is parallel with $Ox$. Said electrodes are respectively connected by insulated cables 6, 7 to the two terminals of a registering galvanometer 8.

The magnetometer is made of a horizontal magnet 12, supported by a torsion wire 10, fixed at 9. Magnet 12 is brought parallel with $Oy$ by the torsion of wire 10. A mirror 11, fast with magnet 12, returns a luminous beam 13 upon a differential setup comprising a double photo-cell 14 and 15, inserted in the circuit of the second recording galvanometer 18 by means of insulated wires 16 and 17. An amplifier, not shown, may be inserted between photo-cell 14, 15 and galvanometer 18; galvanometers 8 and 18 are advantageously arranged for registering on the same photographic film. Galvanometer 3 registers the variations of the component $E_x$ of the electric telluric field and galvanometer 18 the variations of component $H_y$ of the magnetic field. One may also use a simple horizontal magnet supported by a torsion wire, this magnet being brought parallel with $Ox$ either by a torsion of the wire or by using an auxiliary magnetic field. In both cases, it is convenient to ensure the recording by means of a differential set-up comprising a double photo-cell with a barrier layer, inserted in the circuit of the second galvanometer. Such a very simple set-up, which is conventional in physics, already exists, precisely, in certain recording magnetometers. An induction type magnetometer, a magnetron magnetometer, etc., may also be used, or the magnetic field may be measured through the electro-motive force induced by the variations of $H_y$ in a vertical loop, disposed in a plane parallel with $Ox$, this being particularly convenient for the study of the shortest periods.

An increase in the length of the line always makes it possible to obtain a sufficient sensitivity for recording the variations of $E_x$. If, for theoretical reasons or for a question of convenience, it is preferred to use a short line, it is possible then to amplify the line current before sending it through the galvanometer. A preliminary amplification may also be contemplated to record the variations of $H_y$. Although the amplitudes of the varitions of the magnetic field are frequently less than 1 gamma, a sufficient sensitivity is easily obtained, even without any amplification, due to the fact that the method works by using only rapid variations and that a slow "drift" of one or the other spot has no importance. Anyhow, these slow drifts, even when the measuring instruments have not introduced them, always exist, due to the action of the polarization of the electrodes and of the diurnal variation of the electric field during the measure of $E_x$, and due to the diurnal variation of the earth magnetic field during the measure of $H_y$.

It is preferable, in general, to record the respective variations of the electric and of the magnetic fields at the same station. This offers the following advantages:

(1) Suppression of the fixed station, generally called a base-station, where it would otherwise have been necessary to carry out a permanent recording of the magneto-telluric elements while stationing at different points of the ground to be explored.

(2) Possibility of appreciating ipso-facto the simultaneity of phenomena, the coincidence or phase shift, due to the fact that they are recorded on the same film. An accurate synchronic marking for two instruments distant from each other could evidently be obtained by conventional technical means, but it would mean unnecessary complications.

(3) A higher standard in the correlations, i. e. a higher precision for the checking of the linear relationships between magneto-telluric components.

It may be shown, however, that this linear relationship will keep the same form if the magnetic field is observed at one place $O_1$, the electric field at a different place $O_2$ not too distant from $O_1$, and if, therefore, as in Fig. 4, the axes $O_1x$, $O_1y$ for the projection of the magnetic field and the axes $O_2x$ $O_2y$ for the projection of the electric field no longer have the same origin $O$ as in Fig. 1, but two distinct origins $O_1$ and $O_2$. It may be shown, besides, that the coefficients $a$, $b$, $c$, $d$ remain practically unchanged if a not too important translation of the magnetic axes is effected, the electric axes remaining fixed. This is due to the fact that in a telluric sheet, strictly uniform in direction, the following relation $$H_y = -4\pi \int_0^{+\infty} I_x(z)dz$$

would be fulfilled when the $Ox$, $Oy$ angle is equal to $$\frac{+\pi}{2}$$

$I_x(z)$ designating the current density component along $Ox$ at a depth $z$. Now, in conditions of slowly varying currents, the principle of the conservation of electricity requires that the integral in the right hand member be identical, whatever may be the point, $O_1$ or $O_2$, at which it is calculated, although the function $I_x(z)$ would be different at $O_1$ and $O_2$ since this integral measures the total intensity of the telluric current running through an unlimited vertical strip, parallel with $Oy$ and of unit width. This results in another modification in applying the method, which will be used eventually when particular circumstances will make it more convenient. The said modification will consist in recording the magnetic field at one place and the electric field at the other one.

Such a modification may be useful, for instance, when the grounds to be prospected are located under rivers, lakes or the sea. When not working quite close to the shore or over very shallow waters, one is led to carry out the recordings from a boat. While there is no real difficulty, owing to the use of suitable suspensions and special galvanometers, in effecting correct galvanometric recordings on a ship swung by the waves, without the obligation of installing the apparatus on board of a submarine or in a submerged caisson or bell, the carrying out of a magnetic recording from an ordinary boat would require a delicate technique, not only because of the very accurate stabilization which must be required for the magnetometer, but also because of the magnetic disturbances due to the proximity of the ship.

At sea, the practical difficulties raised by the recording of the magnetic field, can be obviated by using the first modification mentioned in the above description of the method. Thus the potential difference may be measured at the ends $f$ and $k$ of an insulated loop (Fig. 5), the sides of which $fg$ and $ih$ hang vertically, the side $gh$ of which rests at the bottom of the water and the side $jk$ of which is laid on the water, held, for instance, by cork floats in the manner of some fishing nets. The potential difference may also be measured between $f$ and $k$, in a circuit like the one of Fig. 6 where $g$ and $h$ are two electrodes immersed in water. Such potential differences or others, measured by means of similar circuits are quantities whose relationships with the surface electric field are equivalent to the relationship which makes the basis of the method herein described.

Although numerous modifications have been described herein and the proposed techniques set forth by way of nonlimitative examples insist more particularly on the utilization of periods of between a few seconds and several minutes, more than on the utilization of shorter or longer periods, it is quite obvious that the invention is not limited to the examples given and that it is capable of numerous modifications within the scope of the appended claims.

What I claim is:

1. In a method for the geophysical exploration of the underground in a given area, the steps of measuring and recording over a given period of time values representing variations occurring in the electric telluric field in said area, and simultaneously measuring and recording over the same period of time values representing variations occurring in the magnetic field of the earth in said area.

2. In a method for the geophysical exploration of the underground in a given area, the steps of measuring and recording over a given period of time the variations occurring in at least one component of the electric telluric field in said area, and simultaneously measuring and recording over the same period of time the variations occurring in at least one horizontal component of the magnetic field of the earth in said area.

3. In a method for the geophysical exploration of the underground in a given area, the steps of measuring and recording over a given period of time the variations occurring in two components of the electric telluric field in said area, and simultaneously measuring and recording over the same period of time the variations occurring over the same period of time the variations occurring in two horizontal components of the magnetic field of the earth in said area.

4. In a method for the geophysical exploration of the underground in a given area, the steps of measuring and recording over a given period of time the variations occurring in a single component of the electric telluric field in said area, and simultaneously measuring and recording over the same period of time the variations occurring in the component of the magnetic field of the earth in said area, which is perpendicular to said telluric component.

5. In a method for the geophysical exploration of the underground in a given area, the steps of measuring and recording on a recording sheet, over a given period of time and at a given point of said area values representing variations occurring in the electric telluric field in said area, and simultaneously measuring and recording at the same point on said recording sheet, over the same period of time, values representing variations occurring in the magnetic field of the earth in said area.

6. In a method for the geophysical exploration of the underground in a given area, the steps of measuring and recording on a recording sheet, over a given period of time and at a given point of said area values representing variations occurring in the electric telluric field in said area, and simultaneously measuring and recording at another point of said area, on a second recording sheet, over the same period of time values representing variations occurring in the magnetic field of the earth in said area.

7. In a method for the geophysical exploration of the underground under a given area of water, in the proximity of land, the steps of measuring and recording, at a point on the water over a given period of time values representing variations occurring in the surface electric telluric field in said area, and simultaneously measuring and recording, at a point on the land, over the same period of time values representing variations occurring in the magnetic field of the earth in said area.

8. In a method for the geophysical exploration of the underground under a given area of water, the steps of immersing two electrodes at the surface of the water in a given vertical plane, measuring and recording over a given period of time the variations of the difference of potential between said electrodes, immersing two other electrodes under the surface of the water, in said given vertical plane, and measuring and recording over said given period of time the variations of the difference of potential between said other electrodes.

References Cited in the file of this patent

UNITED STATES PATENTS

| Number | Name | Date |
| --- | --- | --- |
| 1,902,265 | Rieber | Mar. 21, 1933 |
| 1,940,340 | Zuschlag | Dec. 19, 1933 |
| 1,951,386 | Zuschlag | Mar. 20, 1934 |
| 1,951,387 | Zuschlag | Mar. 20, 1934 |
| 1,997,163 | Zuschlag | Apr. 9, 1935 |
| 2,062,630 | Zuschlag | Dec. 1, 1936 |
| 2,108,463 | Zuschlag | Feb. 15, 1938 |
| 2,291,692 | Cloud | Aug. 4, 1942 |
| 2,359,894 | Brown | Oct. 10, 1944 |